United States Patent
Kleiner

[11] 3,859,339
[45] Jan. 7, 1975

[54] DIALKYL-PHOSPHINYL-ALKANE SULFONATES

[75] Inventor: Hans-Jerg Kleiner, Bad Soden, Taunus, Germany

[73] Assignee: Farbwerke Hoechst Aktiengesellschaft vormals Meister Lucius & Bruning, Frankfurt/Main, Germany

[22] Filed: Aug. 1, 1973

[21] Appl. No.: 384,425

[30] Foreign Application Priority Data
Aug. 3, 1972 Germany.............................. 2238221

[52] U.S. Cl......... 260/513 R, 260/513 B, 260/75 P, 260/DIG. 24
[51] Int. Cl............................................. C07c 143/02
[58] Field of Search ...................... 260/513 B, 513 R

[56] References Cited
UNITED STATES PATENTS
2,789,133  4/1957  Lane et al. ...................... 260/513 B
FOREIGN PATENTS OR APPLICATIONS
886,768  1/1962  Great Britain .................. 260/513 B
2,060,217  6/1972  Germany ........................ 260/606.5

OTHER PUBLICATIONS
Gilbert, "Sulfonation and Related Reactions," Interscience, N.Y., 1965, pp. 136–137.

*Primary Examiner*—Howard T. Mars
*Assistant Examiner*—Nicky Chan
*Attorney, Agent, or Firm*—Curtis, Morris & Safford

[57] ABSTRACT

Dialkyl-phosphinyl-alkane sulfonates of the formula

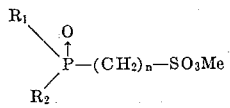

wherein $R_1$ and $R_2$ signify alkyl groups having from 1 to 4 carbon atoms, $n$ signifies a whole number from 1 to 12 and Me is an alkali metal atom are suitable as flame-proofing agents for polyester.

8 Claims, No Drawings

DIALKYL-PHOSPHINYL-ALKANE SULFONATES

The present invention relates to dialkyl-phosphinyl-alkane sulfonates and a process for their preparation.

It is known that certain phosphorus organic compounds are suitable for fire-proofing plastics materials. Although this field has been studied intensively for many years, attempts to find a satisfactory solution to all the requirements have not been successful to date. It has been shown especially, again and again, that the phosphorus organic compounds used up to now often have too low a stability with the usual preparation and processing conditions of plastics materials and sometimes they are not sufficiently inert from the chemical point of view or process such a high steam pressure that they evaporate gradually with thermic stress of the plastics materials under reduced pressure. It is, therefore, of interest to find further compound classes suitable for this purpose.

Since, recently, a process for the preparation of dialkyl halogeno-alkyl phosphine oxides became known from the German Offenlegungsschrift No. 2,060,217 experiments were carried through to convert these compounds by a simple chemical reaction in such a way that they can be used for fire proofing plastics materials.

It has now been found that dialkyl-phosphinyl-alkane sulfonates of the formula (I) 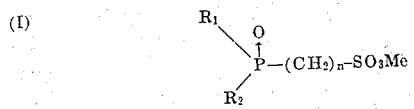

wherein $R_1$ and $R_2$ represent alkyl groups having from 1 to 4 carbon atoms, preferably from 1 to 2 carbon atoms, n is a whole number from 1 to 12, preferably from 1 to 6, especially from 1 to 4 and Me signifies an alkali metal atom, have very desirable properties.

The compounds of the invention can be prepared in good yields by reacting dialkyl-halogeno-alkylphosphine oxides of the formula (II) 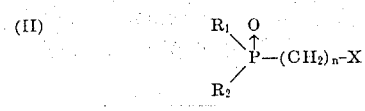

with alkali metal sulfites. In the formula (II) $R_1$ and $R_2$ have the above meaning and X is a halogen atom, preferably chlorine or bromine. Examples for such phosphine oxides are:

dimethyl - chloromethyl - phosphine oxide
diethyl - chloromethyl - phosphine oxide
dipropyl - chloromethyl - phosphine oxide
dimethyl - chloroethyl - phosphine oxide
methyl - ethyl - chloroethyl - phosphine oxide
diethyl - chloroethyl - phosphine oxide
dimethyl - chloropropyl - phosphine oxide
dimethyl - bromopropyl - phosphine oxide
dimethyl - bromobutyl - phosphine oxide
diethyl - chlorobutyl - phosphine oxide
dimethyl - chlorohexyl - phosphine oxide
dimethyl - chlorododecyl - phosphine oxide As alkali metal sulfite the sodium or potassium salt in anhydrous or hydrated form can be used.

The compounds of the invention are prepared simply by heating a dialkyl-halogeno-alkyl-phosphine oxide with the alkali sulfite in a suitable solvent. It may be advantageous to work under increased pressure.

Suitable solvents are, for example, water, low molecular weight alcohols such as methanol or ethanol, optionally in admixture with water, dimethyl formamide, dimethyl sulfoxide, ethane phosphonic acid dimethyl ester, methane phosphonic acid dimethyl ester.

The working up is carried out in known manner. Thus, for example, with the use of water as solvent the reaction mixture can be concentrated by evaporation and dried. The residue consists of an alkali metal halide and the salt of the invention, which can be extracted, for example, with methanol, preferably, however, with glacial acetic acid or formic acid.

The compounds of the invention can be used as fire-proofing agent for the preparation of non-flammable linear polyesters. They have the advantage over the phosphoric organic compounds known up to now used for the finishing of polyesters of a higher thermal stability and a minor volatility. They can be mixed with the polyesters according to the process of . . .

German Application P 2,238,222 filed concurrently herewith before, during, or after polycondensation and render them flame-proof in quantities of 3 to 20 % by weight, calculated on the polyester.

The following examples illustrate the invention.

EXAMPLE 1

25 g of dimethylchloromethyl-phosphine oxide and 25 g of sodium sulfite were mixed with 50 ml of water and boiled for 24 hours at the reflux. Then, the reaction solution was brought to dryness in a rotational evaporating apparatus in the water jet vacuum. The residue was boiled with methanol. It was filtered off from the sodium chloride and the filtrate was concentrated in the water jet vacuum. 27 g of sodium dimethyl phosphinyl methane sulfonate precipitated, melting point over 200°C.

This corresponded to a yield of 70 % of the theory.

| $(CH_3)_2P(O)CH_2SO_3Na$ Molar weight 194 | | |
|---|---|---|
| calculated | 16 % P | 16.5 % S |
| found | 15.6 % P | 16.0 % S |

In the 1 H - n-m-r-spectrum, taken with the Varian -A 60-spectrometer with a measuring frequency of 60 megacycles per second in the solvent $D_2O$ with the reference substance sodium 3-(trimethylsilyl)-propane sulfonate as internal standard the following signals were ascertained:

$\delta CH_3$: 1.75 ppm (6H, dublet, $J_{PH}=$ 14 cycles per second)

$\delta CH_2$: 3.75 ppm (2H, dublet, $J_{PH}=$ 12 cycles per second)

EXAMPLE 2

25 g of dimethylchloro-ethyl-phosphine oxide and 23 g of sodium sulfite were mixed with 50 ml of water and boiled for 24 hours at the reflux. The working up was carried out as in example 1. 26 g of sodium dimethyl-phosphinyl ethane sulfonate were obtained; melting point over 200°C.

This corresponded to a yield of 70 % of the theory.

| | | |
|---|---|---|
| $(CH_3)_2P(O)CH_2CH_2SO_3Na$ | | |
| molar weight 208 | | |
| calculated 14.9 % P | | 15.4 % S |
| found 14.5 % P | | 15.2 % S |

In the 1-H-n-m-r-spectrum taken with the Varion -A 60-spectrometer at a measuring frequency of 60 megacycles per second in the solvent $D_2O$ with the reference substance sodium 3-(trimethylsilyl)-propane sulfonate as internal standard the following signals were ascertained:

$\delta CH_3$: 1.6 ppm (6H, dublet, $J_{PH} = 13$ cycles per second)
$\delta CH_2$: approx. 2.2 ppm (2 H, multiplet)
approx. 3 ppm (2 H, multiplet)

EXAMPLE 3

100 g of dimethylchloromethyl-phosphine oxide, 100 g of sodium sulfite and 100 g of water were kept in a liter shaking autoclave for 12.5 hours at 170°C. The pressure was 6.5 atmospheres gage. After completion of the reaction 108 g of sodium dimethylphosphinylmethane sulfonate were obtained when working up as described in example 1.

This corresponded to a yield of 70 % of the theory.

What is claimed is:

1. Dialkyl-phosphinyl-alkane sulfonates of the formula

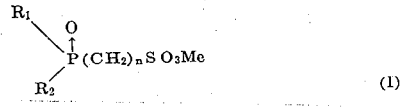
(1)

wherein $R_1$ and $R_2$ signify alkyl groups having from 1 to 4 carbon atoms, $n$ signifies a whole number from 1 to 12 and Me is an alkali metal atom.

2. The compound according to claim 1 alkali metal diethyl phosphinyl ethane sulfonate.

3. The compound according to claim 1 alkali metal dipropyl phosphinyl methyl sulfonate.

4. The compound according to claim 1 alkali metal dimethyl phosphinyl hexyl sulfonate.

5. The compound according to claim 1 sodium dimethyl-phosphinyl methyl sulfonate.

6. The compound according to claim 1 sodium dimethyl-phosphinyl ethane sulfonate.

7. The dialkyl-phosphinyl-alkane sulfonate of claim 1 wherein $R_1$ and $R_2$ signify alkyl groups having 1 to 2 carbon atoms and n signifies a whole number from 1 to 6.

8. The dialkyl-phosphinyl-alkane sulfonate of claim 1 wherein Me is sodium.

* * * * *